United States Patent
Sun et al.

(10) Patent No.: US 6,947,454 B2
(45) Date of Patent: Sep. 20, 2005

(54) LASER PULSE PICKING EMPLOYING CONTROLLED AOM LOADING

(75) Inventors: Yunlong Sun, Beaverton, OR (US);
Brady E. Nilsen, Beaverton, OR (US);
David M. Hemenway, Beaverton, OR (US); Lei Sun, Aloha, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 254 days.

(21) Appl. No.: 10/611,798

(22) Filed: Jun. 30, 2003

(65) Prior Publication Data

US 2004/0264517 A1 Dec. 30, 2004

(51) Int. Cl.[7] .............................................. H01S 3/10
(52) U.S. Cl. ............................. 372/26; 372/92; 372/90
(58) Field of Search .............................. 372/26, 92, 90; 219/121.62, 121.82, 121.85

(56) References Cited

U.S. PATENT DOCUMENTS

| | | | |
|---|---|---|---|
| 4,930,901 A | 6/1990 | Johnson et al. | 372/26 |
| 5,041,716 A | 8/1991 | Wakabayashi et al. | 219/121.68 |
| 5,197,074 A | 3/1993 | Emmons, Jr. et al. | 372/26 |
| 5,226,051 A | 7/1993 | Chan et al. | 372/30 |
| 5,347,392 A * | 9/1994 | Chen et al. | 359/279 |
| 5,509,022 A * | 4/1996 | Lowery et al. | 372/18 |
| 5,590,141 A | 12/1996 | Baird et al. | 372/10 |
| 5,748,655 A * | 5/1998 | Yessik et al. | 372/22 |
| 5,751,585 A | 5/1998 | Cutler et al. | 364/474.03 |
| 6,057,180 A | 5/2000 | Sun et al. | 438/132 |
| 6,172,325 B1 * | 1/2001 | Baird et al. | 219/121.62 |
| 6,339,604 B1 | 1/2002 | Smart | 372/26 |
| 6,559,412 B2 | 5/2003 | Lauer et al. | 219/121.69 |
| 6,574,250 B2 | 6/2003 | Sun et al. | 372/25 |
| 2002/0005396 A1 | 1/2002 | Baird et al. | 219/121.68 |
| 2002/0167581 A1 | 11/2002 | Cordingly et al. | 347/173 |
| 2002/0185474 A1 | 12/2002 | Dunsky et al. | 219/121.7 |
| 2003/0047541 A1 | 3/2003 | Sun et al. | 219/121.7 |

FOREIGN PATENT DOCUMENTS

| WO | WO03/052890 | 6/2003 | H01S/3/10 |
|---|---|---|---|

OTHER PUBLICATIONS

International Search Report and Written Opinion concerning corresponding International Application No. PCT/US2004/014013.

(Continued)

*Primary Examiner*—Minsun Oh Harvey
*Assistant Examiner*—Delma R. Flores-Ruiz
(74) *Attorney, Agent, or Firm*—Stoel Rives LLP

(57) ABSTRACT

A laser (126) and an AOM (10) are pulsed at substantially regular and substantially similar constant high repetition rates to provide working laser outputs (40) with variable nonimpingement intervals (50) without sacrificing laser pulse-to-pulse energy stability. When a working laser output (40) is demanded, an RF pulse (38) is applied to the AOM (10) in coincidence with the laser output (24) to transmit it to a target. When no working laser output (40) is demanded, an RF pulse (38) is applied to the AOM (10) in noncoincidence with the laser output (24) so it gets blocked. So the average thermal loading on the AOM (10) remains substantially constant regardless of how randomly the working laser outputs (40) are demanded. The AOM (10) can also be used to control the energy of the working laser output (40) by controlling the power of the RF pulse (38) applied. When the RF power is changed, the RF duration (44) of the RF pulse (38) is modified to maintain the constant average RF power. Consistent loading on the AOM (10) eliminates deterioration of laser beam quality and laser beam pointing accuracy associated with thermal loading variation on the AOM (10) and is advantageous for applications such as IC chip link processing where stable working laser outputs (40) with variable output intervals (50) are needed.

42 Claims, 6 Drawing Sheets

OTHER PUBLICATIONS

Wang, Y. et al., "Pulse Selection from a Mode–Locked TE $CO_2$ Laser Output Using a Resonant Acousto–Optic Modulator" Proc. SPIE—Int. Soc. Opt. Eng. (USA), vol. 3268, Jan. 27, 1998, pp. 70–80.

Balakshy, V. et al., Compensation of Thermal Effects in Acousto–Optic Deflector Proc. SPIE—Int. Soc. Opt. Eng. (USA), vol. 2713, Jun. 26, 1995, pp. 164–171.

* cited by examiner

LASER PULSE PICKING EMPLOYING CONTROLLED AOM LOADING

COPYRIGHT NOTICE

© 2003 Electro Scientific Industries, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

This invention relates to lasers and, more particularly, to a method and an apparatus for providing high-repetition-rate, stable-energy laser pulses on demand with a load-controlled acousto-optic modulator ("AOM") to minimize distortion of the quality or positional accuracy of the laser beam.

SUMMARY OF THE INVENTION

Lasers are widely employed in a variety of R & D operations including spectroscopic and biotech study and industrial operations including inspecting, processing, and micromachining a variety of electronic materials and substrates. For example, to repair a dynamic random access memory ("DRAM"), laser pulses are used to sever electrically conductive links to disconnect faulty memory cells from a DRAM device, and then to activate redundant memory cells to replace the faulty memory cells. Because faulty memory cells needing link removals are randomly located, the links that need to be severed are located randomly. Thus, during the laser link repairing process, the laser pulses are fired at random pulse intervals. In other words, the laser pulses are running at a wide variable range of pulse repetition frequencies ("PRFs"), rather than at a constant PRF. For industrial processes to achieve greater production throughput, the laser pulse is fired at the target link without stopping the laser beam scanning mechanism. This production technique is referred to in the industry as "on-the-fly" ("OTF") link processing. Other common laser applications employ laser pulses that are fired only when they are needed at random time moments.

However, the laser energy per pulse typically decreases with increasing PRF while laser pulse width increases with increasing PRF, characteristics that are particularly true for Q-switched, solid-state lasers. While many laser applications require randomly time-displaced laser pulses on the demand, these applications also require that the laser energy per pulse and the pulse width be kept substantially constant. For link processing on memory or other integrated circuit ("IC") chips, an inadequate laser energy will result in incomplete link severing, while too much laser energy will cause unacceptable damage to the passivation structure or the silicon substrate. The acceptable range of laser pulse energies is often referred to as a "process window." For many practical IC devices, the process window requires that laser pulse energy vary by less than 5% from a selected pulse energy value.

Skilled persons have taken various approaches for ensuring operation within a process window or for expanding the process window. For example, U.S. Pat. No. 5,590,141 for METHOD AND APPARATUS FOR GENERATING AND EMPLOYING A HIGH DENSITY OF EXCITED IONS IN A LASANT, which is assigned to the assignee of this application, describes solid-state lasers having lasants exhibiting a reduced pulse energy drop-off as a function of PRF and, therefore, a higher usable PRF. Such lasers are, therefore, capable of generating more stable pulse energy levels when operated below their maximum PRF. U.S. Pat. No. 5,265,114 for SYSTEM AND METHOD FOR SELECTIVELY LASER PROCESSING A TARGET STRUCTURE OF ONE OR MORE MATERIALS OF A MULTIMATERIAL, MULTILAYER DEVICE, which is also assigned to the assignee of this application, describes using a longer laser wavelength such as 1,320 nanometers ("nm") to expand the link process window to permit a wider variation of the laser pulse energy during the process. U.S. Pat. No. 5,226,051 for LASER PUMP CONTROL FOR OUTPUT POWER STABILIZATION, which is assigned to Lightwave Electronics, describes a technique of equalizing the laser pulse energy by controlling the current of the pumping diodes. The technique works well in practical applications employing a laser PRF below about 25 or 30 kHz.

The above-described laser processing applications typically employ infrared ("IR") lasers having wavelengths from 1,047 nm to 1,324 nm, running at a PRF not more than about 25 or 30 kHz. However, production needs are demanding much higher throughput, so lasers should be capable of operating at PRFs much higher than about 25 kHz, such as 50–60 kHz or higher. In addition, many laser processing applications are improved by employing ultraviolet ("UV") energy wavelengths, which are typically less than about 400 nm. Such UV wavelengths may be generated by subjecting an IR laser to a harmonic generation process that stimulates the second, third, or fourth harmonics of the IR laser. Unfortunately, due to the nature of the harmonic generation, the pulse-to-pulse energy levels of such UV lasers are particularly sensitive to time variations in PRF and laser pulse interval.

U.S. Pat. No. 6,172,325 for LASER PROCESSING POWER OUTPUT STABILIZATION APPARATUS AND METHOD EMPLOYING PROCESSING POSITION FEEDBACK, which is also assigned to the assignee of this application, describes a technique of operating the laser at a constant high repetition rate in conjunction with a position feedback-controlled laser pulse picking or gating device to provide laser pulse picking on demand, at random a time interval that is a multiple of the laser pulse interval, with good laser pulse energy stability and high throughput.

A typical laser pulse picking or gating device is an acousto-optic modulator ("AOM") or electro-optic modulator ("EOM", also referred to as a Pockels cell). Typical EOM materials such as KD*P or KDP suffer from relatively strong absorption at the UV wavelengths, which results in a lower damage threshold of the material at the wavelength used and a local heating along the laser beam path within the device, causing changes of the half-wave-plate voltage of the device. Another disadvantage of the EOM is its questionable ability to perform well at a repetition rate over 50 kHz. AOM material is, on the other hand, quite transparent to the UV of 250 nm up to the IR of 2,000 nm, which allows the AOM to perform well throughout typical laser wavelengths within the range. An AOM can also easily accommodate the desirable gating of pulses at a repetition rate of up to a few hundred kHz. One disadvantage of the AOM is its limited diffraction efficiency of about 75–90%.

FIG. 1 shows a typical AOM 10 employed for a laser pulse picking or gating application, and FIGS. 2A–2D (collectively FIG. 2) show corresponding prior art timing graphs for laser pulses 14, AOM radio-frequency ("RF") pulses 18, and AOM output pulses. FIG. 2A shows constant repetition-rate laser pulses 14a–14k that are emitted by a laser and propagated to an AOM 10. FIG. 2B demonstrates two exemplary schemes for applying RF pulses 18 to AOM 10 to select which of the laser pulses 14 are propagated toward a target. In a first scheme, a single RF pulse 18cde shown in dashed lines is extended to cover a time period that includes laser pulses 14a, 14b, and 14c; and, in a second scheme, separated RF pulses 18c, 18d, and 18e are generated to individually cover the respective time periods for laser pulses 14a, 14b, and 14c. FIGS. 2C and 2D show the respective first-order beam 20 and zero-order beam 16 propagated from AOM 10 as determined by the presence or absence of RF pulses 18 applied to AOM 10.

With reference to FIGS. 1 and 2, AOM 10 is driven by an RF driver 12. When no RF power 22 is applied to AOM 10, the incoming laser pulses 14 pass through AOM 10 substantially along their original beam path and exit as zero-order beam 16. When RF power 22 is applied to AOM 10, part of the incoming laser pulse's energy is diffracted from the beam path of the zero-order beam 16 to a beam path of a first-order beam 20. The diffraction efficiency is defined as the ratio of the laser energy in the first order beam 20 to the laser energy in the incoming beam of laser pulses 14. Either the first-order beam 20 or the zero-order beam 16 can be used as a working beam, based on different application considerations. For simplicity, the pulses from the laser that enter AOM 10 will be referred to as "laser pulses" or "laser output", and the pulses delivered to a target because they are picked by the AOM 10 will be referred to as "working laser pulses" or "working laser output".

When the first-order beam is used as the working beam, the energy of the working laser pulses can be dynamically controlled from 100% of its maximum value down to substantially zero, as the RF power 22 changes from its maximum power to substantially zero, respectively. Because the practical limited diffraction efficiency of an AOM 10 under an allowed maximum RF power load is about 75–90%, the maximum energy value of the working laser pulses is about 75–90% of the laser pulse energy value from the laser. However, when the zero-order beam 16 is used as the working beam, the energy of the working laser pulses can be dynamically controlled from 100% of the maximum value of the laser pulse energy from the laser down to 15–20% of the maximum value, as the RF power 22 changes from substantially zero to its maximum power, respectively. For memory link processing, for example, when the working laser pulse is not on demand, no leakage of system laser pulse energy is permitted, i.e., the working laser pulse energy should be zero so that the first-order laser beam 20 is used as the working beam.

With reference again to FIG. 2, RF power 18 is applied to an AOM 10 only when a working laser pulse is demanded at random time intervals, in this case at random integral multiples of the laser pulse interval, and, therefore, results in random variable thermal loading on the AOM 10. Thermal loading on AOM 10 causes geometric distortion and temperature gradients in the AOM 10, which cause gradients in its refractive index. These consequences of thermal loading will distort a laser beam passing through the AOM 10, resulting in deteriorated laser beam quality and instability in the laser beam path or poor beam positioning accuracy. These distortions could be corrected to some degree if they could be kept constant. However, when the system laser pulses are demanded randomly, such as in laser link processing, these distortions will have the same random nature and cannot be corrected practically.

Test results on an AOM device, such as a Model N23080-2-1.06-LTD, made by NEOS Technologies, Melbourne, Fla., showed that with only 2 W RF power, the laser beam pointing accuracy can deviate as much as 1 mrad when the RF power 22 to the AOM 10 is applied on and off randomly. This deviation is a few hundred times greater than the maximum allowed for the typical memory link processing system. Laser beam quality distortion due to the random thermal loading on the AOM 10 will also deteriorate the focusability of the laser beam, resulting in a larger laser beam spot size at the focusing point. For applications such as the memory link processing that require the laser beam spot size to be as small as possible, this distortion is very undesirable.

What is needed, therefore, is an apparatus and a method for randomly picking working laser pulses from a high-repetition-rate laser pulse train without causing distortion to the laser beam quality and positioning accuracy due to the random thermal loading variation on the AOM. Moreover, what is needed is an apparatus and method for generating working laser pulses having constant laser energy per pulse and constant pulse width on demand and/or on-the-fly at a high PRF and with high accuracy at vastly different pulse time intervals for a variety of laser applications such as spetroscopic, biotech, or micromachining applications, such as laser link processing on memory chips.

SUMMARY OF THE INVENTION

An object of this invention is, therefore, to provide an apparatus and a method for picking laser pulses on demand from a high-repetition-rate pulsed laser.

Another object of this invention is to perform such pulse picking with minimal thermal loading variation on the AOM to minimize distortion to laser beam quality and positioning accuracy.

Still another object of this invention is to provide an apparatus and a method for generating system laser pulses on demand, having stable pulse energies and stable pulse widths at selected wavelengths from the UV to near IR and at high PRFs for high-accuracy laser processing applications, such as memory link severing.

The present invention uses a laser with high-repetition-rate pulsed output in cooperation with an extra-cavity AOM device for picking or gating the laser pulses such that selected laser pulses are transmitted to the target on demand, while the rest of the laser pulses are blocked. Instead of applying the RF pulses to the AOM only when the working laser pulses are demanded (as is done in the prior art), RF pulses with substantially similar pulse interval times, such as those of the laser pulses, are applied to the AOM regardless of whether a working laser pulse is demanded. Whenever a working laser pulse is demanded, the RF pulse is applied in coincidence with the corresponding laser pulse. Whenever a working laser pulse is not demanded, an RF pulse is also applied to the AOM, but in noncoincidence with the corresponding laser pulse. The RF pulse in noncoincidence with the laser pulse preferably has the same RF power and duration time as does the RF pulse in coincidence with the laser pulse. The timing shift between noncoincident RF pulses and the laser pulses is small enough so that the time shifts are substantially negligible in terms of thermal loading on the AOM. Thus, the AOM will experience substantially no thermal loading variation, regardless of how randomly the working laser pulses are demanded.

In a preferred embodiment, the working laser pulses are picked or gated from laser pulses generated at a constant high repetition rate or at a constant laser pulse interval. Such working laser pulses have high stability and consistency in their energy and pulse width.

Similarly, the AOM is operated at a substantially constant RF power loading or constant thermal loading, regardless of how randomly the working laser pulses are demanded. So, there is substantially no adverse effect on the working laser beam quality and its pointing accuracy due to having a randomly transmissive AOM.

The RF pulse power can also be controlled to perform working laser pulse energy control with the same AOM device to suit application needs. To avoid an adverse effect on the working laser beam quality due to the random variation of the RF pulse power for performing laser pulse energy control, the RF pulse duration can be modulated accordingly such that the product of the RF pulse power and the RF pulse duration remains substantially constant, or an additional RF pulse can be added such that the total RF energy applied to the AOM during one laser pulse interval remains substantially constant.

This invention is advantageous for generating stable pulse-to-pulse working laser pulse energy for applications that ordinarily require randomly shutting the laser pulse on or off, including applications such as IC chip link severing. This invention is also advantageous for stabilizing the working laser pulse-to-pulse energy of a Q-switched solid-state laser that employs a nonlinear harmonic generation process to produce frequency-doubled, -tripled, or -quadrupled laser pulses, in which the working laser pulses are shut on and off randomly.

This invention is advantageous for typical AOM materials, such as fused quartz and tellurium dioxide ($TeO_2$) used in the previously mentioned AOM Model N23080-2-1.06-LTD, that are quite transparent to laser wavelengths in a broad spectrum range, from the UV spectrum all the way to near IR, such as from 250 nm to 2,000 nm. In a preferred embodiment, the first-order beam is employed as the working beam; however, for some applications, if 10–15% leakage of the laser pulse energy does not cause problems, then either the first-order beam or the zero-order beam can be used as the working beam.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
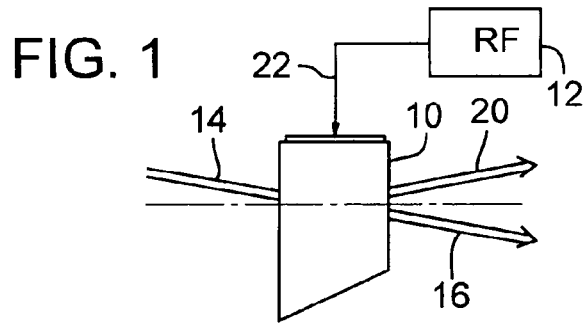
FIG. 1 is a partly schematic view of a prior art AOM device and an RF driver, transmitting a zero-order beam and/or a first-order beam.
Figure 2A:
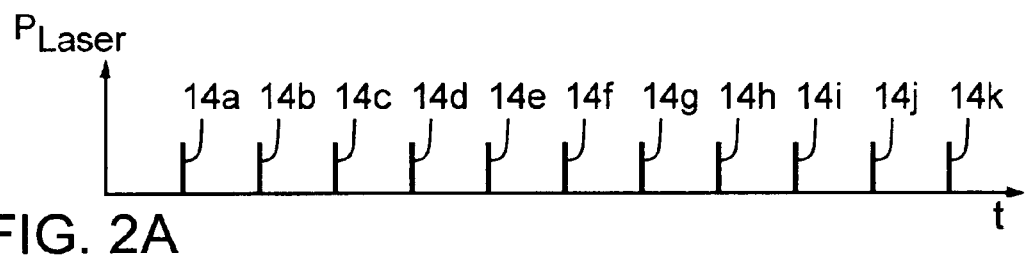
FIGS. 2A–2D are corresponding prior art timing graphs of laser pulses, RF pulses, and first and zero-order AOM output laser pulses.
Figure 2B:
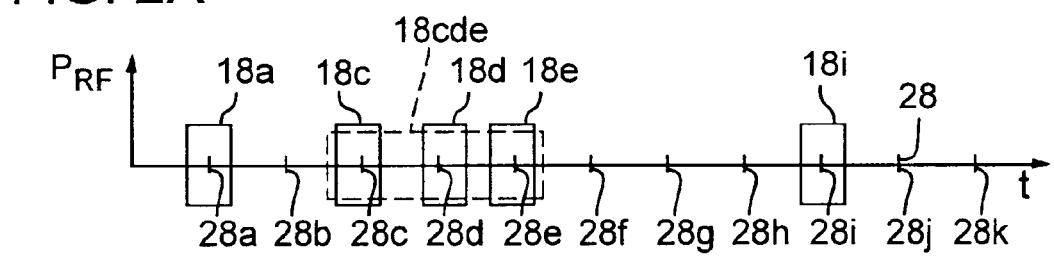
Figure 2C:
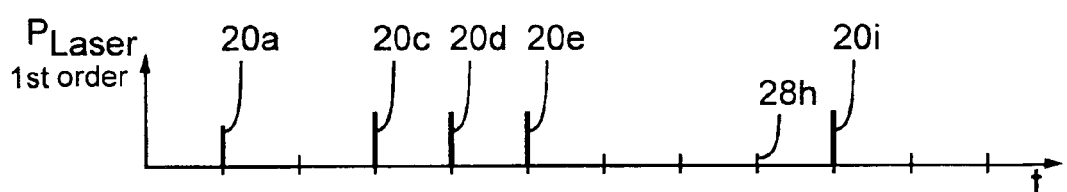
Figure 2D:
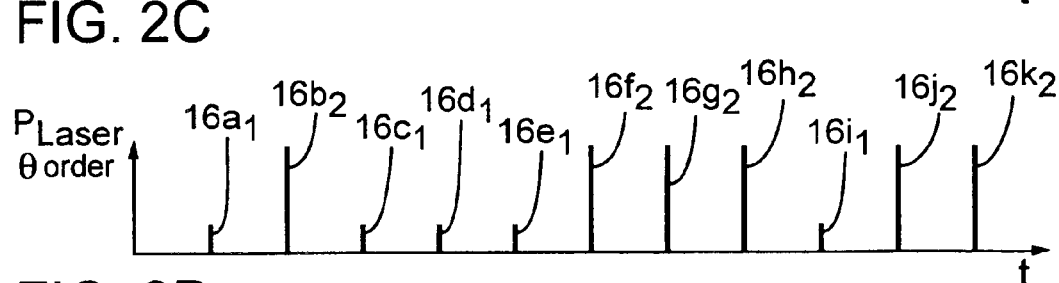
Figure 3A:
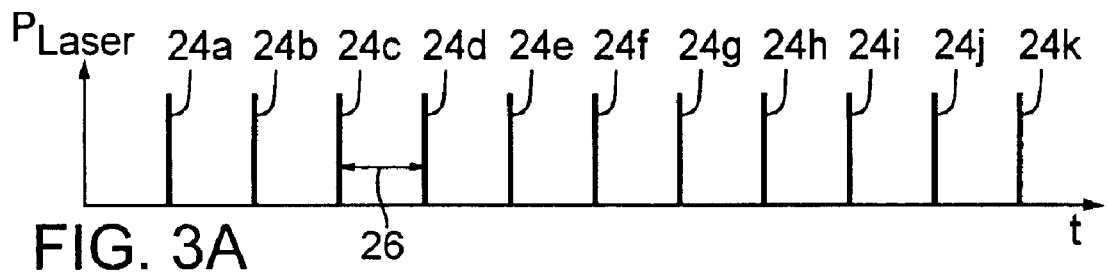
FIGS. 3A–3C are corresponding exemplary timing graphs of laser outputs, RF pulses, and working laser outputs as employed in a preferred embodiment.
Figure 3B:
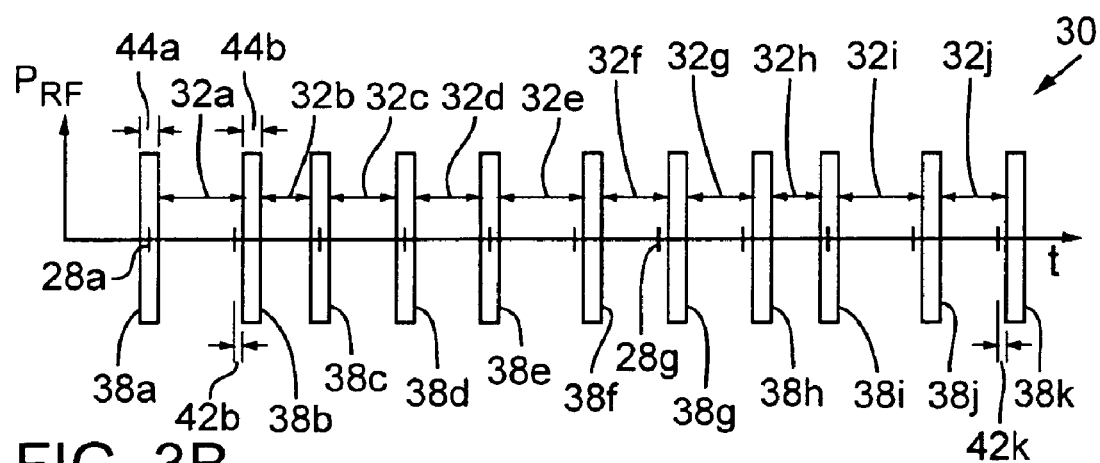
Figure 3C:
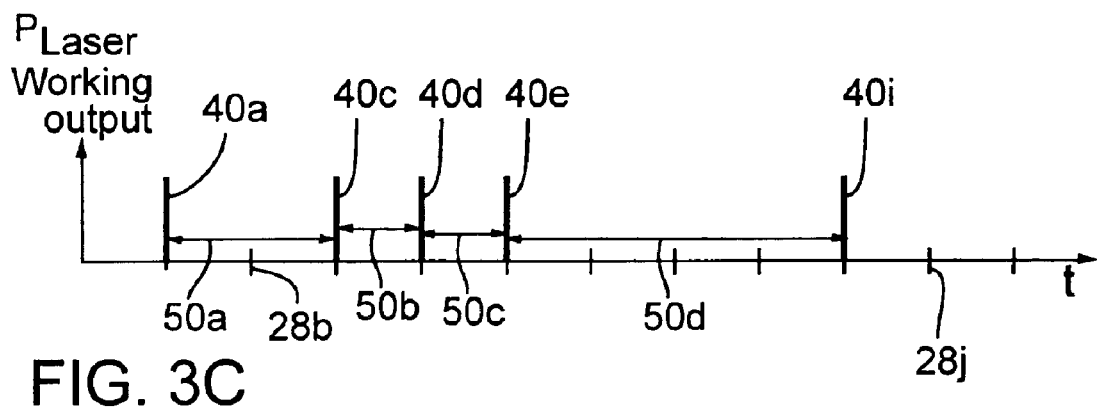

FIGS. 3A–3C (collectively FIG. 3) show corresponding timing graphs of laser outputs 24a–24k (generically laser outputs 24), RF pulses 38a–38k (generically RF pulses 38) applied to AOM 10, and working laser outputs 40a, 40c, 40d, 40e, and 40i (generically working laser output 40). In particular, FIG. 3A shows laser outputs 24 that are emitted by a laser 126 (FIG. 7) at a constant repetition rate and separated by substantially identical laser output intervals 26. In typical embodiments, the laser output repetition rate may be from about 1 kHz up to about 500 kHz. Exemplary laser output repetition rates are greater than about 25 kHz, greater than about 40 kHz, or greater than about 100 kHz. For link processing embodiments, each working laser output 40 preferably includes a typical single laser pulse with a multiple-nanosecond pulse width. However, skilled persons will recognize that each working laser output 40 may include a burst of one or more laser pulses each having an ultrashort pulse width, such as disclosed in U.S. Pat. No. 6,574,250 for LASER SYSTEM AND METHOD FOR PROCESSING A MEMORY LINK WITH A BURST OF LASER PULSES HAVING ULTRASHORT PULSE WIDTHS, which is assigned to assignee of this application, or bursts of one or more pulses having pulse widths between about 10 picoseconds and about one nanosecond.

FIG. 3B shows a preferred embodiment of an RF pulsing scheme 30 that employs RF pulses 38 separated by RF pulse intervals 32a–32j (generically RF pulse intervals 32) that are substantially regular or uniform to maintain variations of thermal loading on AOM 10 to within a preassigned operational tolerance. Such tolerance may be a specific thermal load window, but the preassigned tolerance may also or alternatively be windows of spot size or beam position accuracy. In one embodiment, the thermal loading variation is maintained within 5% and/or the beam pointing accuracy is maintained within 0.005 mrad. In a preferred embodiment, at least one RF pulse 38 is generated to correspond with each laser output 24.

Whenever a working laser output 40 is demanded to impinge a target such as an electrically conductive link 60 (FIG. 6A), an RF pulse 38 is applied to AOM 10 in coincidence with a laser output 24 such that it is transmitted through AOM 10 and becomes a working laser output 40.

In FIG. 3B, the coincident RF pulses 38 are RF pulses 38a, 38c, 38d, 38e, and 30i. FIG. 3C shows the resulting corresponding working laser outputs 40a, 40c, 40d, 40e, and 40i. When no working laser output is demanded to correspond with a laser output 24, an RF pulse 38 is applied to AOM 10 in noncoincidence with laser output 24. In FIG. 3B, the noncoincident RF pulses 38 are RF pulses 38b, 38f, 38g, 38h, and 38j. FIG. 3C shows that no working laser outputs 40 correspond with the noncoincident RF pulses 38.

The noncoincident RF pulses 38 are preferably offset from the initiations of respective laser outputs 40 by a time offset 42 that is longer than about 0.5 microseconds. Skilled persons will appreciate that while time offsets 42 are shown to follow laser outputs 40 in FIG. 3B, the time offsets 42 could alternatively precede laser outputs 40 by a sufficient time period to prevent targeting of working laser output 40. Thus, RF pulse intervals 32 surrounding a noncoincident RF pulse 38 may be shorter (such as RF pulse intervals 32*b*, 32*f*, and 32*h*) than the overall average RF pulse interval 32 (such as 32*c*, 32*d*, 32*f*, 32*g*, and 32*i*) or longer (such as RF pulse intervals 32*a*, 32*e*, and 32*i*) than the average RF pulse intervals 32.

With reference again to FIG. 3C, the nonimpingement intervals 50*b* and 50*c* between working laser outputs 40*c* and 40*d* and between working laser outputs 40*d* and 40*e*, respectively, are about the same as the laser output interval 26. The nonimpingent intervals 50*a* and 50*d* between working laser outputs 40*a* and 40*c* and between working laser outputs 40*e* and 40*i*, respectively, are roughly multiples of the laser output interval 26.

Skilled persons will appreciate that even though the working laser output 40 is preferably the first-order beam 20 for most applications, such as link processing, the working laser output 40 may be the zero-order beam 16 where leakage is tolerable and higher working laser output power is desirable.

In a preferred embodiment, the coincident and noncoincident RF pulses 38 not only employ about the same RF energy, which is the product of an RF power value and an RF duration, but also employ about the same RF power value and about the same RF duration.

Figure 4A:
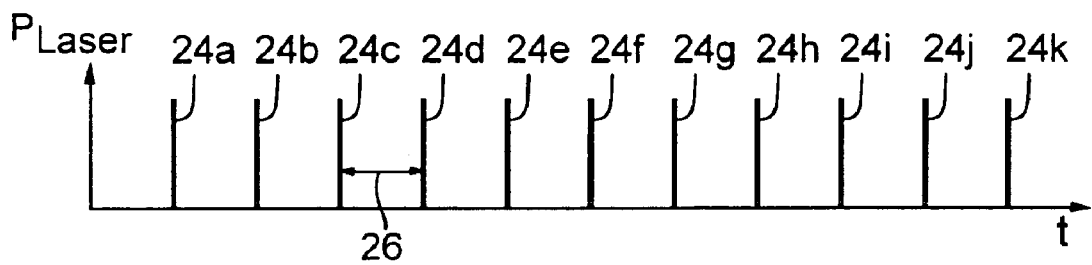
FIGS. 4A–4C are alternative corresponding exemplary timing graphs of laser outputs, RF pulses, and working laser outputs that demonstrate the use of the AOM for energy control of the working laser outputs.
Figure 4B:
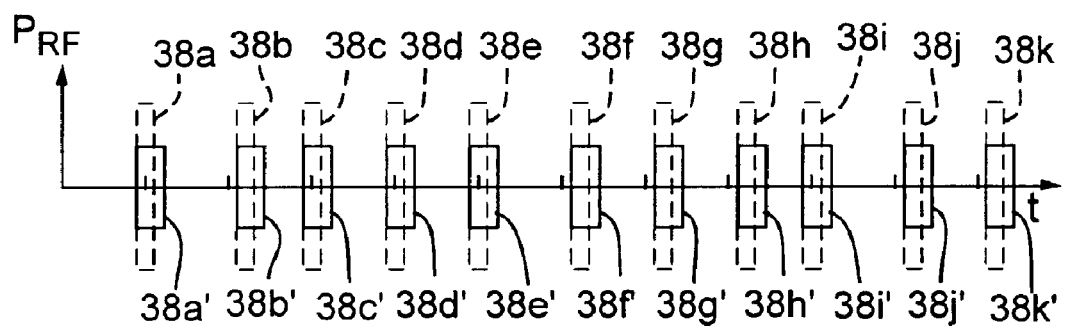
Figure 4C:
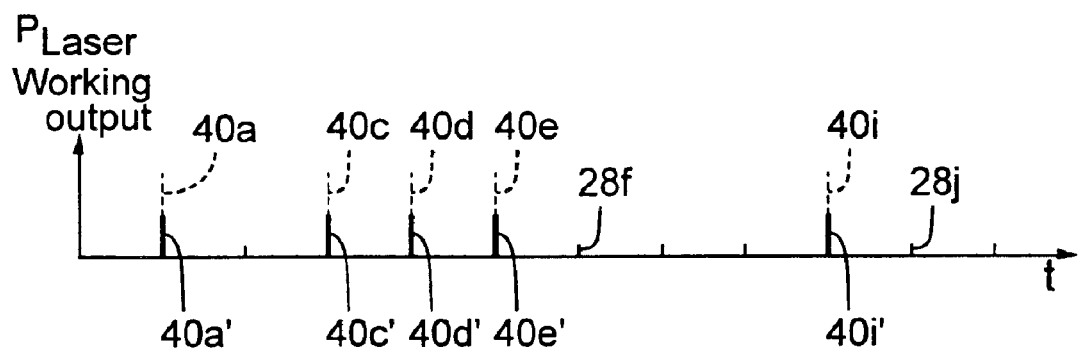

FIGS. 4A–4C (collectively FIG. 4) show corresponding timing graphs of laser outputs 24, RF pulses 38 applied to AOM 10, and working laser outputs 40 that demonstrate how AOM 10 can be additionally employed to control the output power of working laser outputs 40. FIG. 4A is identical to FIG. 3A and is shown for convenience only. FIGS. 4B and 4C show RF pulses 38' and working laser outputs 40' with the corresponding RF pulses 38 and working laser outputs 40 shown superimposed on them in dashed lines for convenience. The energy of working laser outputs 40' is attenuated by employing less RF power to AOM 10 for RF pulses 38' than for RF pulses 38; however, the RF durations 44' are increased for RF pulses 38' over the RF durations 44 employed for RF pulses 38 to maintain a substantially constant product of RF power value and RF duration in order to maintain substantially constant thermal loading on AOM 10. Skilled persons will appreciate that this technique would permit on-demand selection for a continuum of output powers between working laser outputs 40 or 40' without substantial variance in thermal loading on AOM 10. Skilled persons will also appreciate that the RF power values and RF durations 44 of the noncoincident RF pulses 38 can be kept as original or can be altered to be within a specified tolerance of the RF loading variation of the coincident RF pulses 38'.

RF pulse duration 44 is preferably selected to be from about one microsecond to about a half of the laser output interval 26, more preferably shorter than 30% of the laser output interval 26. For example, if the laser repetition rate is 50 kHz and the laser output interval 26 is 20 microseconds, the RF pulse duration 44 can be anywhere between one and ten microseconds. The minimum RF pulse duration 44 is determined by the laser pulse jittering time and the response time of AOM 10. For coincident RF pulse 38, it is preferable to initiate laser output 24 at the middle point of the RF pulse 38. For noncoincident RF pulse 38, it is preferable for the RF offset to be delayed by about half of the minimum RF pulse duration 44 from the initiation of the corresponding laser output 24.

Figure 5A:
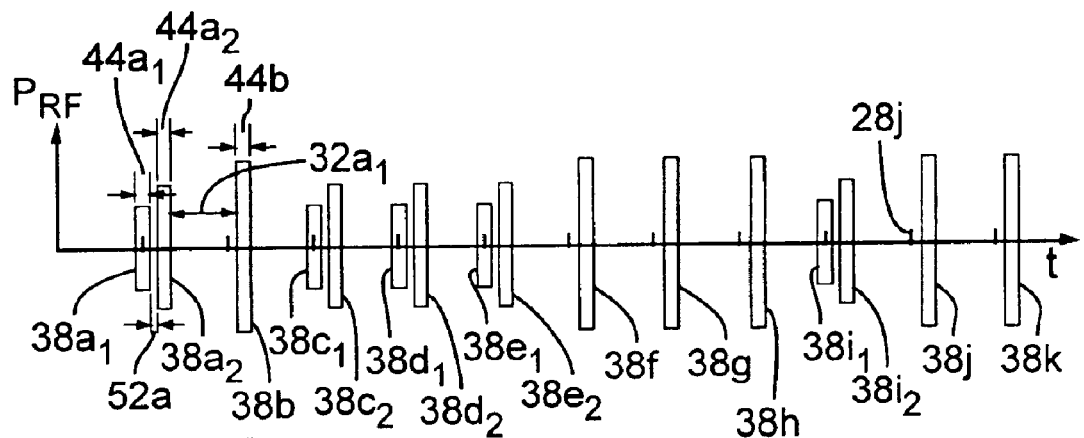
FIGS. 5A and 5B are alternative corresponding exemplary timing graphs of RF pulses and working laser outputs that demonstrate the dynamic control range of working laser output energy afforded by the AOM.
Figure 5B:
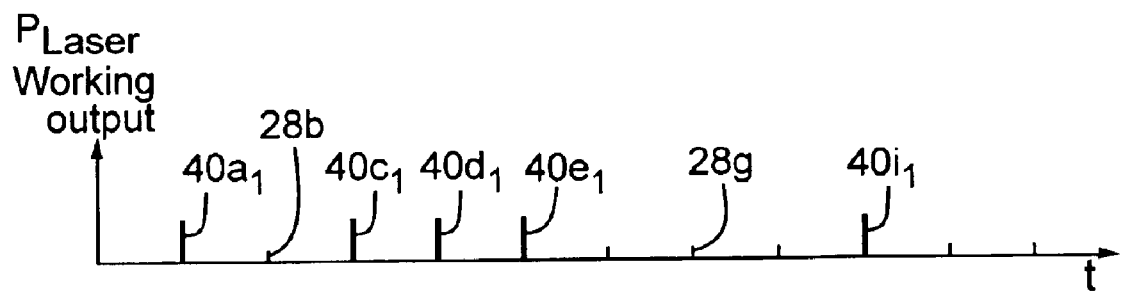

FIGS. 5A–5B (collectively FIG. 5) show alternative corresponding timing graphs for RF pulses 38 and working laser outputs 40 that demonstrate a large dynamic control range of the working laser output energy.

With reference to FIG. 5, a very low-energy working laser output 40*a*₁ can be generated by applying an RF pulse 38*a*₁, of a near minimum of RF power sufficient to permit targeted propagation of working laser output 40*a*. The RF duration 44*a* coincident with laser output 24*a* may be kept short, such as the same duration as RF duration 44, to minimize variations in RF pulse intervals 32, and one or more additional noncoincident RF pulses 38*a*₂ having higher RF power, but also a short RF duration 44*a*₂, may be applied to AOM 10 such that the sum of the RF energy loading for RF pulses 38*a*₁ and 38*a*₂ substantially equals that of RF pulse 38*b*. In a preferred embodiment, the offset time 52 between RF pulses 38*a*₁ and 38*a*₂ can be from zero to a few microseconds. Skilled persons will appreciate that RF pulses 38*a*₁ and 38*a*₂ can be merged into a single RF pulse 38 that ramps up the RF power after laser output 24*a* is completed. Skilled persons will also appreciate that RF pulse 38*a*₂ may precede RF pulse 38*a*₁ instead of following it. Skilled persons will appreciate that due to the thermal inertia of AOM 10, small differences in RF interval 32*a*₁ and RF intervals 32 will not cause any meaningful thermal loading variation from the point of view of deterioration of the laser beam quality and pointing accuracy. Accordingly, the RF interval 32*a*₁ can be kept sufficiently similar to RF intervals 32 to maintain variations in thermal loading on AOM 10 within a preassigned operational tolerance. The original noncoincident RF pulse 38*b* can be maintained at its original RF duration 44*b* and RF power value, or it can be modulated in the same manner as the set of RF pulses 38*a*₁ and 38*a*₂.

Figure 6A:
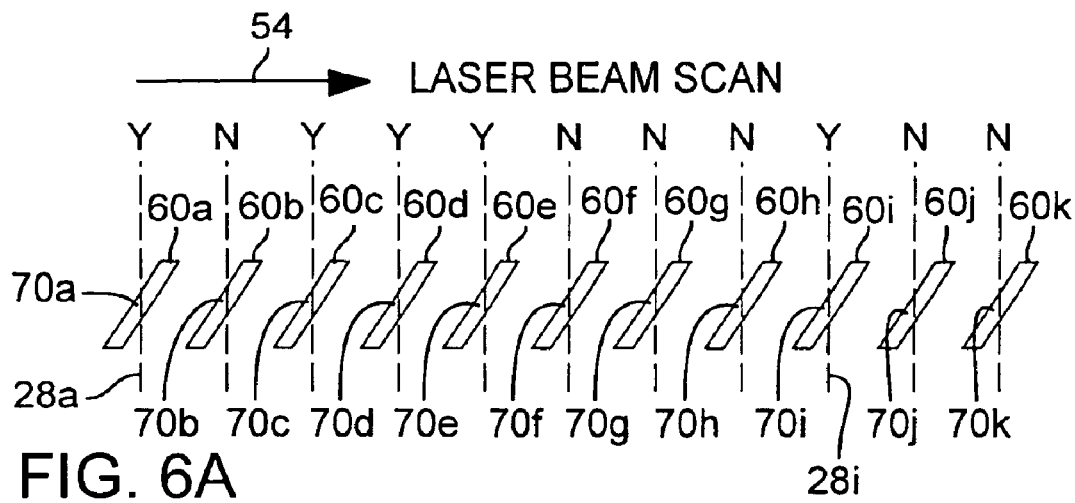
FIGS. 6A–6C are corresponding timing and beam position graphs that demonstrate how working laser outputs may be randomly demanded for an exemplary link processing application.
Figure 6B:
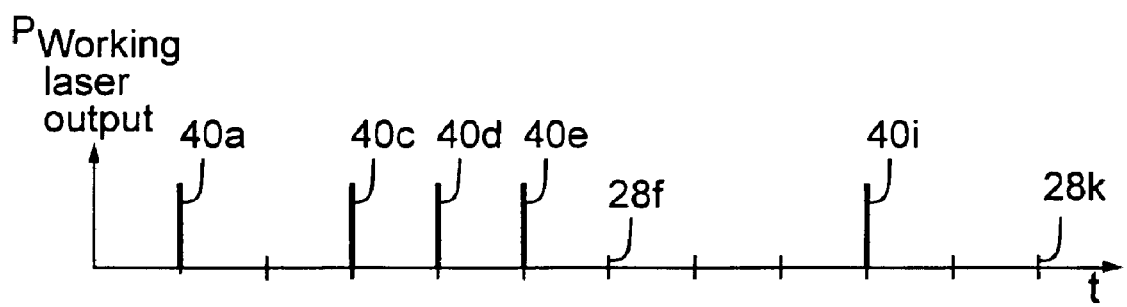
Figure 6C:
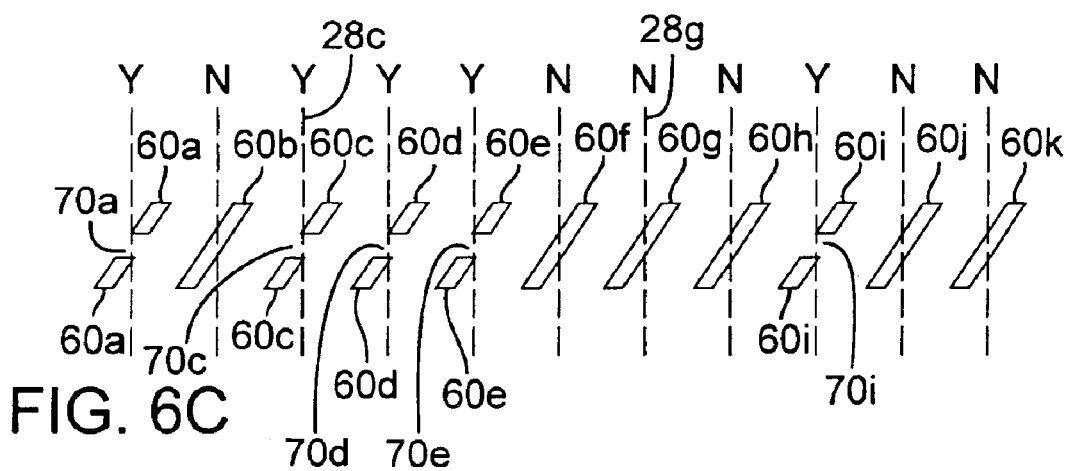

FIGS. 6A–6C (collectively FIG. 6) show timing graphs of the target alignment position 70 (also scanning position 70) (FIG. 7) and the working laser outputs 40 during an exemplary laser micromachining process, such as laser processing of electrically conductive links 60*a*–60*k* (generically links 60). FIG. 6A shows a typical link bank 62 having evenly spaced links 60 that are crossed in a scan direction 64 by a target alignment position 70 of a beam positioning system. Based on the results of chip testing, the positioning system is controlled to target randomly positioned links 60 that must be severed to repair an IC device or other workpiece 120 (FIG. 7) while the remaining links 60 remain intact. For example, the scan speed of the beam positioning system can be set to be constant or can be controlled and variable such that the target alignment position 70 crosses over each link 60 at substantially constant positioning intervals, and the laser 126 fires laser outputs at a substantially constant interval, which equals the positioning interval. Thus, with the right timing coordination, whenever position 70 crosses over a link 60, a laser output 24 is fired. For convenience, the links 60*a*, 60*c*, 60*d*, 60*e*, and 60*i* are designated for severing such that FIG. 6B, which depicts working laser outputs 40, can be identical to FIG. 3C. The working laser outputs 40*a*, 40*c*, 40*d*, 40*e*, and 40*i*, therefore, impinge links 60*a*, 60*c*, 60*d*, 60*e*, and 60*i*. FIG. 6C shows links 60*a*, 60*c*, 60*d*, 60*e*, and 60*i* after they have been severed. The laser outputs 24 are fired in synchronization with the scanning position 70 and at the same constant interval such that each working laser output 40 would hit one link 60. Thus, with the help of the laser pulse picking or gating AOM 10, whenever a link 60 is selected for removal, the AOM 10 transmits the laser output 24 to sever link 60 as working laser output 40. Whenever a link 60 is not selected, the AOM 10 does not transmit the laser output 24, so the link 60 remains intact. In this manner, the laser 126 is running at a substantially constant repetition rate and the laser outputs 24 have a substantially constant interval 26, but the working laser outputs 40 occur at random multiple intervals of the laser output interval 26.

Figure 7:
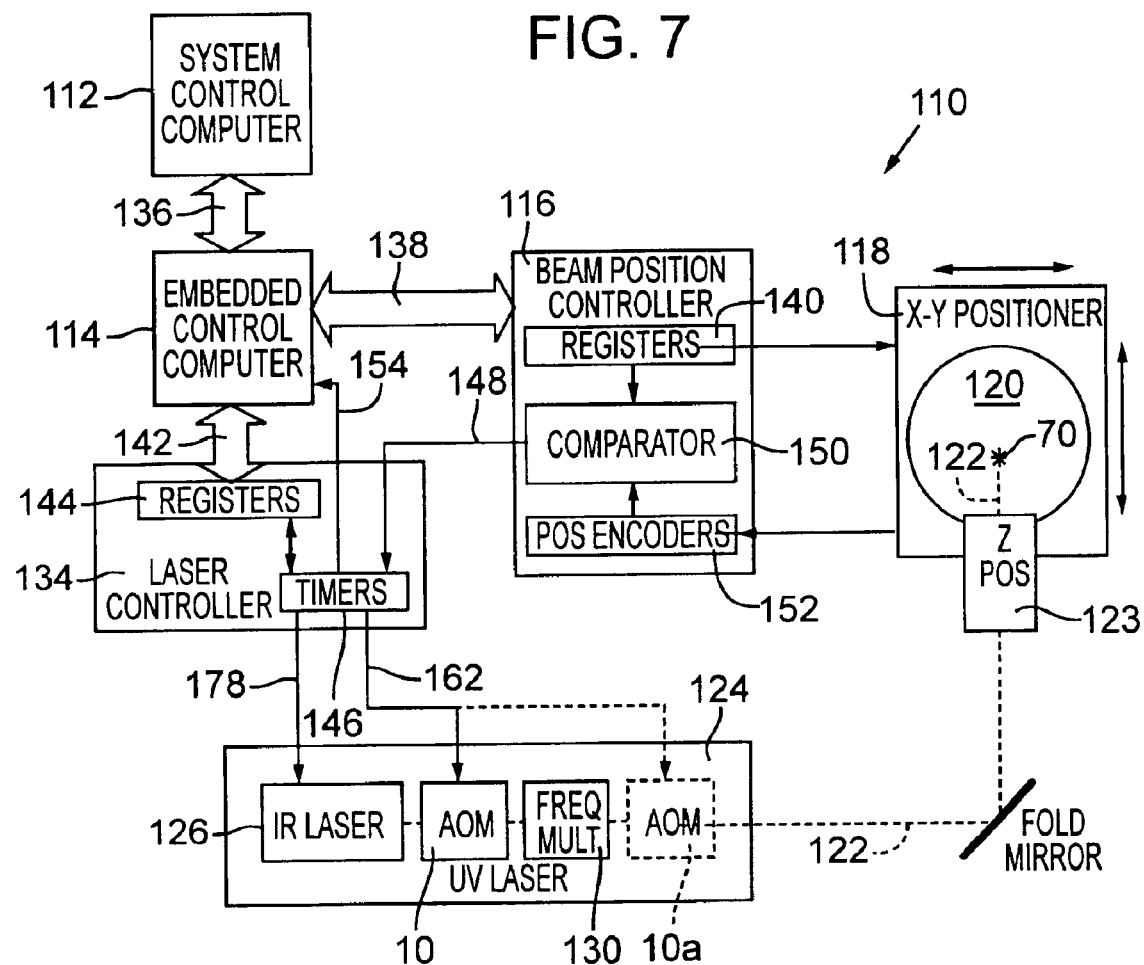
FIG. 7 is a schematic block diagram showing a preferred embodiment of an exemplary laser system employing a consistently thermally loaded AOM to provide stable pulse-to-pulse UV laser energy on demand to process unevenly spaced links selected for removal.

FIG. 7 shows, as an example, an IC chip link severing system 110 employing RF loading control on AOM 10 to provide stable pulse-to-pulse UV laser energy on demand for processing unevenly spaced links with undistorted working laser output 40. In system 110, a system control computer 112 and an embedded control computer 114 co-act to control a beam position controller 116 that receives position information from an X-Y positioner 118 that positions a workpiece 120 relative to a target alignment position 70 of a working laser output 40. Working laser output 40 may propagate through various optical elements (not shown) in addition to the fold mirrors that are shown. X-Y positioner 118 may also include a Z positioner 123 that may be coupled to either the X or Y stage. X-Y positioner 118 is preferably based on a positioning system described in U.S. Pat. No. 5,751,585 for HIGH SPEED, HIGH ACCURACY MULTI-STAGE TOOL POSITIONING SYSTEM, which is assigned to the assignee of this application.

In one embodiment, a UV laser subsystem 124 preferably includes a Q-switched solid state IR laser 126, such as a diode-pumped, acousto-optically Q-switched Nd:YVO$_4$ laser; an AOM 128 for picking or gating and amplitude-modulating the laser output of IR laser 126; and a frequency multiplier 130 for converting the infrared wavelength emissions from IR laser 126 into green and/or UV wavelengths by employing well-known second, third, or fourth harmonic conversion processes. AOM 10 may be alternatively positioned after frequency multiplier 130 as indicated by the position of an AOM 10a (generically AOM 10) shown in phantom lines. In either embodiment, a laser controller 134 controls the transmissivity of AOM 10 to transmit or block the laser outputs 24 from the laser 126 to propagate working laser outputs 40 on demand toward workpiece 120.

System control computer 112 conveys across a bus 136 into embedded control computer 114 position coordinates of workpiece 120 locations requiring laser processing. In a typical specimen processing application, workpiece 120 includes regularly spaced-apart device structures, such as fusible links 60, only some of which require processing. The locations requiring processing are referred to as "target locations", and the locations not requiring processing are referred to as "intermediate locations". Embedded control computer 114 adds to the target location coordinates intermediate location coordinates that are spaced apart to trigger IR laser 126 at nearly equal intervals 26. Embedded control computer 114 conveys the target and intermediate position coordinates one at a time at a predetermined rate across a bus 138 to registers 140 in beam position controller 116 and simultaneously loads control data across a bus 142 to registers 144 in laser controller 134. The predetermined rate controls the movement velocity of X-Y positioner 118, and the control data indicate whether the coordinate location is a target location to be processed and may further include output mode, timing, and amplitude information.

Laser controller 134 operates timers 146 in either an autopulse mode or a pulse-on-target mode. In autopulse mode, timers 146 start in response to the control data in registers 144; and, in the pulse-on-target mode, timers 146 start in response to receiving a position coincidence signal 148 from a comparator 150 in beam position controller 116. Position encoders 152 in beam position controller 116 indicate to comparator 150 the current position of X-Y positioner 118, and when the current position matches the position coordinates stored in registers 140, position coincidence signal 148 is generated, indicating that workpiece 120 is properly positioned over a target position or an intermediate position. Accordingly, if workpiece 120 is positioned over a target position, timers 146 simultaneously operate the Q-switch in IR laser 126 and set AOM 10 to a transmissive state by applying an RF pulse 38 with predetermined RF power and RF duration 44 to AOM 10 such that a working laser output 40 passes through AOM 10 and hits the target link 60. If workpiece 120 is positioned over an intermediate position, timers 146 operate the Q-switch in IR laser 126 and apply an RF pulse 38 with predetermined RF power and RF duration 44 to AOM 10 only after a predetermined time offset 42 from the Q-switch operation. Thus, the RF pulse 38 is in noncoincidence with laser output 24 and no working laser output 40 is gated through.

Since the movement velocity of X-Y positioner 118 is preferably controlled such that the positioner 118 moves over the combination of the targets and intermediate positions at a constant rate, the laser Q-switch is fired at such a constant repetition rate, or in other words, the laser output interval 26 is made substantially equal to position move times. Therefore, the IR laser 126 is operated at a substantially constant repetition rate, or the laser output interval 26 is substantially constant so there are virtually negligible instabilities in laser output 24 and in laser pulse harmonic conversion due to the variation of the laser output interval 26. Further details concerning on-demand triggering of AOM 10 can be found in U.S. Pat. No. 6,172,325 for LASER PROCESSING POWER OUTPUT STABILIZATION APPARATUS AND METHOD EMPLOYING PROCESSING POSITION FEEDBACK, which is herein incorporated by reference.

The RF loading control techniques provide nearly constant thermal loading on AOM 10 by applying an RF pulse 38 to AOM 10 in coincidence with laser output 40 when the positioner 118 is over a target or, in other words, when a working laser output 40 is demanded, and by applying an RF pulse 38 with the same RF energy to AOM 10 but in non-coincidence with the laser output 24 when the positioner 118 is over an intermediate position or, in another words, when a working laser output 40 is not demanded. Skilled persons will appreciate that with such substantially constant thermal loading on AOM 10, there are minimal adverse effects by AOM 10 on the quality and positioning accuracy of working laser output 40.

It will be further appreciated that the RF power of the RF pulse 38 on AOM 10 can be adjusted to control the energy of working laser output 40 to meet target processing needs, while the RF duration 44 of the RF pulse 38 can be controlled accordingly to maintain a substantially constant Rf energy or arithmetic product of the RF power and the RF duration 44 of the RF pulse 38.

Skilled persons will recognize that portions of this invention may be implemented differently from the implementations described above for preferred embodiments. It will be obvious to those having skill in the art that many changes may be made to the details of the above-described embodiments without departing from the underlying principles of the invention. The scope of the present invention should, therefore, be determined only by the following claims.

What is claimed is:

1. In a laser-based system that generates pulsed laser emission and includes an extra-cavity optical modulator for providing in response to control commands an output transmitting state that permits laser output to propagate toward a target in the form of working laser output and an output blocking state that predominantly prevents working laser output from propagating toward the target, the laser system applying during its operation varying thermal load conditions to the extra-cavity optical modulator as a consequence of nonuniform intervals between successive output transmitting states, the varying load conditions causing undesirable distortion of the working laser output, a method of reducing the load variation and the undesirable distortion of the working laser output, comprising:

generating a series of laser outputs at a substantially constant laser output repetition rate in which mutually adjacent ones of the laser outputs are separated from each other by generally uniform laser output intervals;

applying RF pulses to the extra-cavity optical modulator to produce a series of output transmitting states at an RF pulse repetition rate in which mutually adjacent ones of the output transmitting states are separated from each other by RF pulse intervals of sufficient uniformity to maintain variations of thermal loading of the extra-cavity optical modulator to within a preassigned operational tolerance; and timing the production of the RF pulses and the generation of the laser outputs in response to control commands to achieve noncoincidence of an output transmitting state and a corresponding laser output during a noncoincident RF pulse to prevent working laser output and to achieve coincidence of an output transmitting state and a corresponding laser output during a coincident RF pulse to transmit working laser output to achieve impingement of targets at different working laser output intervals.

2. The method of claim 1, in which an RF pulse has an RF power value and an RF duration and in which the working laser output has a power value, further comprising:

changing the RF power value of a coincident RF pulse to cause a corresponding change in the power value of the working laser output.

3. The method of claim 2, in which the product of the RF power value and RF duration remains substantially constant in response to the changing of the RF power value of the RF pulse.

4. The method of claim 3 in which consecutive working laser outputs produced by respective coincident RF pulses have different power values.

5. The method of claim 1 in which the thermal loading variation is maintained within 5%.

6. The method of claim 2 in which consecutive coincident and noncoincident RF pulses have different RF durations.

7. The method of claim 2 in which consecutive coincident and noncoincident RF pulses have different RF power values.

8. The method of claim 2 in which consecutive coincident and noncoincident RF pulses have similar RF power values and similar RF durations.

9. The method of claim 2 in which the RF power values of coincident RF pulses are smaller than the RF power values of consecutive noncoincident RF pulses, and the consecutive coincident and noncoincident RF pulses have about the same RF durations, further comprising:

introducing at least one additional noncoincident RF pulse during an adjacent laser pulse interval to the working laser output such that the sum of the products of the respective RF power values and RF durations of the respective coincident and additional noncoincident RF pulse substantially equals the product of the RF power value and RF duration of the noncoincident RF pulse.

10. The method of claim 1 in which the difference between the laser output intervals and RF pulse intervals is sufficiently small to maintain variations of thermal loading of the extra-cavity modulator to within a preassigned operational tolerance.

11. The method of claim 1 in which RF pulses comprise RF durations that are shorter than about 30% of adjacent laser output intervals.

12. The method of claim 11 in which the RF pulses comprise RF durations that are longer than about 0.1 microsecond.

13. The method of claim 1 in which noncoincident RF pulses are offset from initiations of respective laser outputs by a time delay that is longer than about 0.2 microsecond.

14. The method of claim 1 in which intervals between mutually adjacent working laser outputs comprise different durations that approximate integral multiples of the laser output intervals.

15. The method of claim 1 in which noncoincident RF pulses occur while a positioning system moves between different targets on a work piece.

16. The method of claim 1 in which the control commands are adapted for on-the-fly link processing.

17. The method for claim 1 in which the laser-based system is adapted for micromachining.

18. The method for claim 1 in which the laser-based system is adapted for spectroscopic, biotech or R & D work.

19. The method of claim 1 in which beam pointing accuracy is maintained within 0.005 mrad.

20. The method of claim 1 in which the laser output repetition rate is greater than about 25 kHz.

21. The method of claim 1 in which the laser output repetition rate is greater than about 40 kHz.

22. The method of claim 1 in which the laser output repetition rate is greater than about 100 kHz.

23. The method of claim 1 in which the working laser outputs comprise a wavelength emitted by a UV, visible, or IR laser or a harmonic thereof.

24. The method of claim 1 in which at least some of the working laser outputs comprise at least two laser pulses.

25. The method of claim 1 in which the distortion of the working laser output comprises beam spot size on the target.

26. The method of claim 1 in which RF pulse intervals define timing windows having continuous RF power at an RF power value and the working laser output has a minor power value, and in which applying the RF pulses comprises applying RF pulses of a power value that is smaller than the RF power value such that the working laser output propagates toward the target at a higher power value than the minor power value.

27. In a laser-based, workpiece processing system that generates working laser output, including a positioning system for controlling target alignment of the working laser output relative to a workpiece such that the working laser output impinges on selected electrically conductive links supported on a semiconductor wafer, and including an extra-cavity optical modulator for providing in response to control commands an output transmitting state that permits laser output to propagate toward an electrically conductive link on a workpiece in the form of working laser output and an output blocking state that predominantly prevents working laser output from propagating toward the workpiece, the laser system applying during its operation varying thermal load conditions to the extra-cavity optical modulator as a consequence of nonuniform intervals between successive output transmitting states, the varying load conditions causing undesirable distortion of the working laser output, a method of reducing the undesirable thermal load variation and distortion of the working laser output, comprising:

generating a series of laser outputs at a substantially constant laser output repetition rate in which mutually adjacent ones of the laser outputs are separated from each other by generally uniform laser output intervals;

applying RF pulses to the extra-cavity optical modulator to produce a series of output transmitting states at an RF pulse repetition rate in which mutually adjacent ones of the output transmitting states are separated from each other by RF pulse intervals of sufficient uniformity to maintain variations of thermal loading of the extra-cavity optical modulator to within a preassigned operational tolerance;

moving the target alignment of the positioning system relative to the workpiece to address selected electrically conductive links on the workpiece;

timing the production of the RF pulses and the generation of the laser outputs to achieve noncoincidence of an output transmitting state and a corresponding laser output during a noncoincident RF pulse to prevent working laser output from damaging the workpiece whenever the positioning system is not addressing a selected electrically conductive link; and timing the production of the RF pulses and the generation of the laser outputs to achieve coincidence of an output transmitting state and a corresponding laser output during a coincident RF pulse to transmit working laser output to achieve impingement of electrically conductive links at different working laser output intervals.

28. The method of claim 27 in which the laser output repetition rate is greater than about 30 kHz.

29. The method of claim 28 in which the positioning system addresses only a single electrically conductive link during an RF pulse.

30. The method of claim 28, in which an RF pulse has an RF power value and an RF duration and in which the working laser output has a power value, further comprising:

changing the RF power value of a coincident RF pulse to cause a corresponding change in the power value of the working laser output.

31. The method of claim 30, in which the product of the RF power value and RF duration remains substantially constant in response to the changing of the RF power value of the RF pulse.

32. The method of claim 31 in which consecutive working laser outputs produced by respective coincident RF pulses have different power values.

33. The method of claim 30 in which the RF power values of coincident RF pulses are smaller than the RF power values of consecutive noncoincident RF pulses, and the consecutive coincident and noncoincident RF pulses have about the same RF durations, further comprising:

introducing at least one additional noncoincident RF pulse during an adjacent laser pulse interval to the working laser output such that the sum of the products of the respective RF power values and RF durations of the respective coincident and additional noncoincident RF pulse substantially equals the product of the RF power value and RF duration of the noncoincident RF pulse.

34. The method of claim 1 in which the working laser output comprises zero order laser output.

35. The method of claim 27 in which the working laser output comprises zero order laser output.

36. The method of claim 1 in which the working laser output comprises first order laser output.

37. The method of claim 27 in which the working laser output comprises first order laser output.

38. The method of claim 28 in which RF pulses comprise RF durations that are shorter than about 30% of adjacent laser output intervals.

39. The method of claim 38 in which the RF pulses comprise RF durations that are longer than about 0.1 microsecond.

40. The method of claim 28 in which noncoincident RF pulses are offset from initiations of respective laser outputs by a time delay that is longer than about 0.2 microsecond.

41. The method of claim 28 in which beam pointing accuracy is maintained within 0.005 mrad.

42. The method of claim 28 in which the thermal loading variation is maintained within 5%.

* * * * *

UNITED STATES PATENT AND TRADEMARK OFFICE
CERTIFICATE OF CORRECTION

PATENT NO. : 6,947,454 B2  Page 1 of 1
DATED : September 20, 2005
INVENTOR(S) : Sun et al.

It is certified that error appears in the above-identified patent and that said Letters Patent is hereby corrected as shown below:

Column 1,
Lines 52-53, change "on the demand" to -- on demand --.

Column 2,
Line 46, change "at random a time interval" to -- at a random time interval --.

Column 3,
Line 54, change "RF power 18" to -- RF power 22 --.

Column 8,
Line 6, change "RF pulse $38a_1$," to -- RF pulse $38a_1$ --.
Line 19, change "38a," to -- $38a_1$ --.

Column 10,
Line 53, change "Rf energy" to -- RF energy --.

Signed and Sealed this

Second Day of May, 2006

JON W. DUDAS
*Director of the United States Patent and Trademark Office*